Feb. 11, 1936.                M. RICCI                2,030,320
                        PRECISION INSTRUMENT
                       Filed Jan. 27, 1934          2 Sheets-Sheet 1
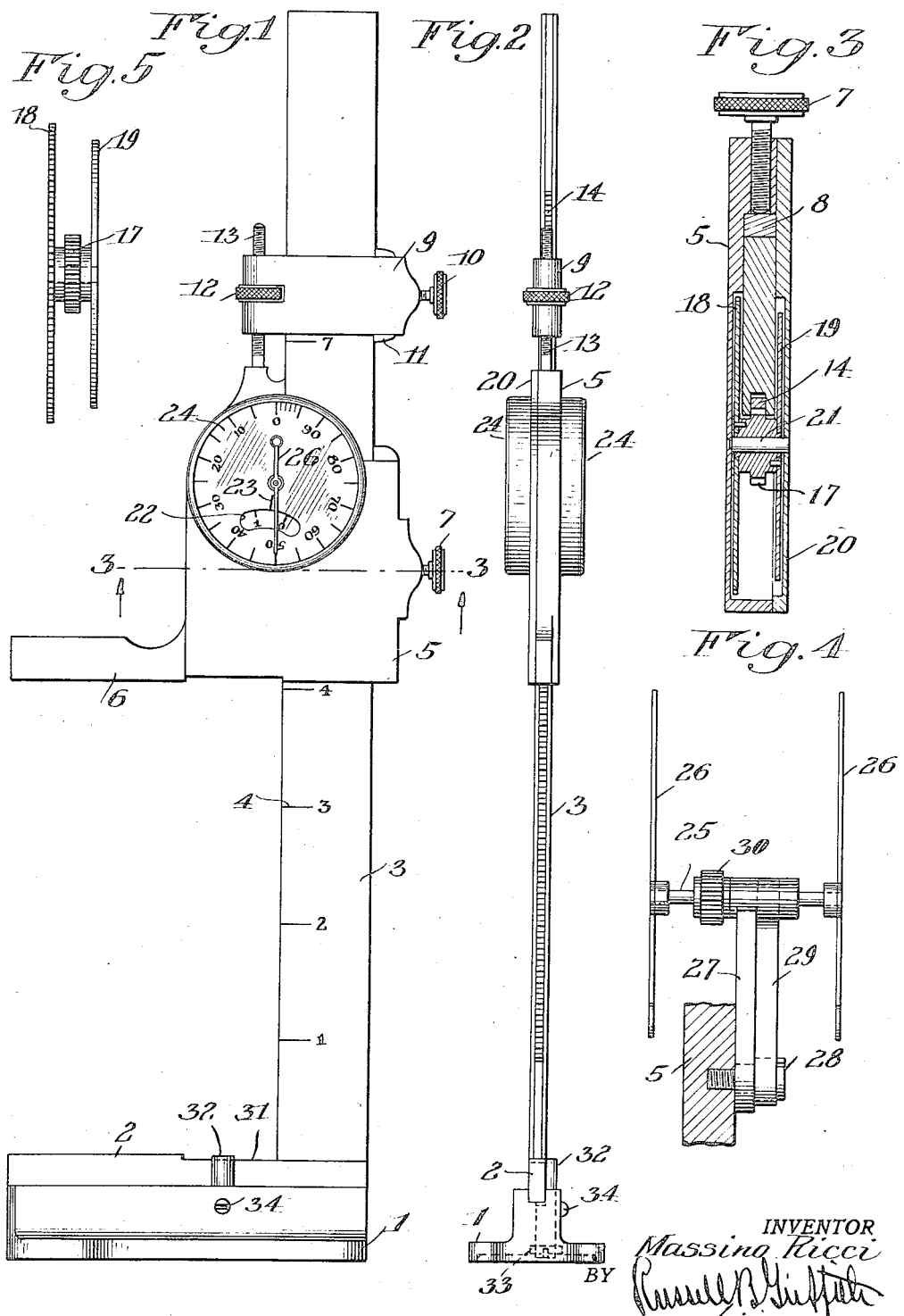
INVENTOR
Massino Ricci
BY
his ATTORNEY

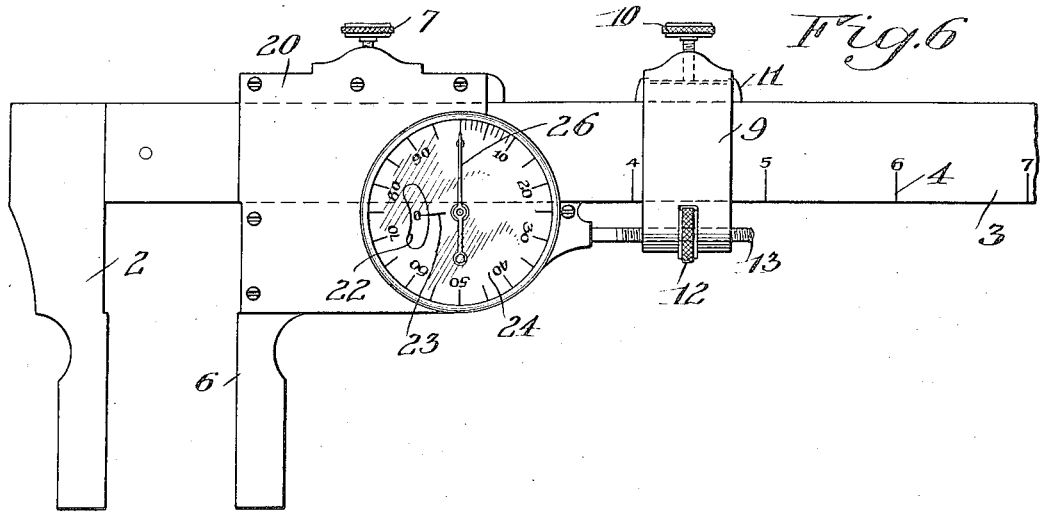
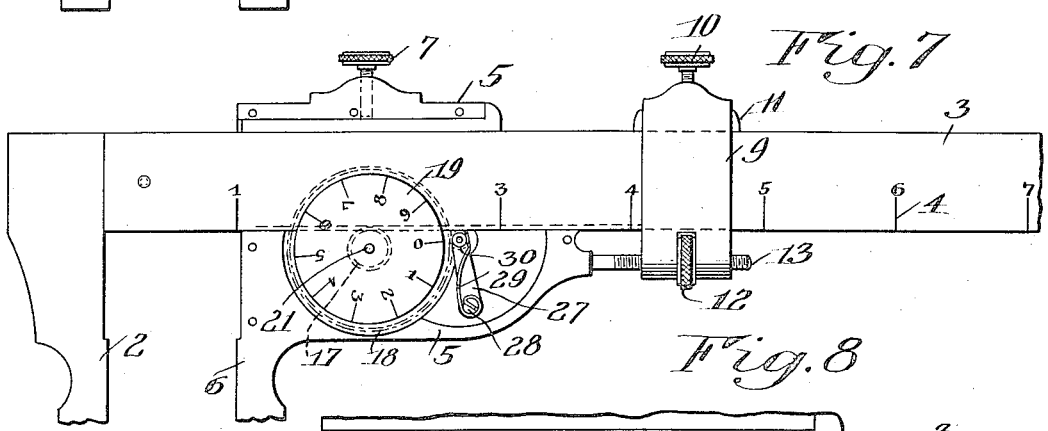
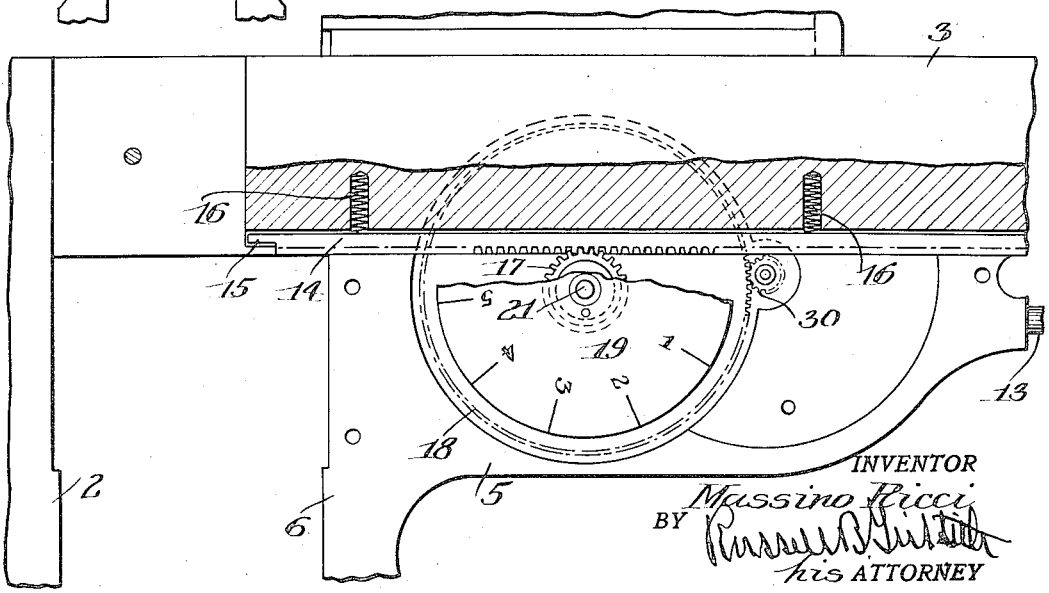

Patented Feb. 11, 1936

2,030,320

UNITED STATES PATENT OFFICE 2,030,320

PRECISION INSTRUMENT

Massino Ricci, Seneca Falls, N. Y., assignor of one-half to Albert Calarco, Seneca Falls, N. Y.

Application January 27, 1934, Serial No. 708,633

3 Claims. (Cl. 33—147)

My present invention relates to precision instruments and more particularly to measuring tools, such as micrometer calipers, height gauges and structures adaptable for a combination of such uses, and it has for its general object to provide an instrument of this character that will be extremely accurate and register in a manner easily and quickly read without opportunity for mistake calibrations in units of measurement of high denomination. The improvements are directed in part toward providing an instrument that can be read with equal facility from both sides; wherein the gearing is kept accurately in mesh and toward particular means for effecting coarse and fine adjustments with respective readings thereof.

To these and other ends, the invention resides in certain improvements and combinations of parts, all as will be hereinafter more fully described, the novel features being pointed out in the claims at the end of this specification.

In the drawings:

Fig. 1 is a side view of a measuring instrument rigged as a height gauge constructed in accordance with and illustrating one embodiment of my invention;

Fig. 2 is an edge view thereof;

Fig. 3 is an enlarged horizontal section taken substantially on the line 3—3 of Fig. 1;

Fig. 4 is a further enlarged detail view in fragmentary section, showing the mounting of the high denomination indicators;

Fig. 5 is a detail edge view on the scale of Fig. 3 of the low denomination dials;

Fig. 6 is a fragmentary view corresponding to Fig. 1 but showing the device in use as a caliper and in another position of adjustment;

Fig. 7 is a view corresponding to Fig. 6 but with the cover plate of the carriage removed to reveal interior parts, and Fig. 8 is a further enlarged fragmentary view corresponding to Fig. 7 but with parts further removed or broken away to reveal underlying structure.

Similar reference numerals throughout the several views indicate the same parts.

Referring more particularly to the drawings and first to Figs. 1, 2 and 3 thereof, 1 indicates a height gauge base to which is detachably secured a fixed caliper jaw 2 on a scale or stem 3 having the usual graduations 4 which, in the present instance, are in units of an inch. Slidable vertically on this stem is a carriage 5 from which projects the movable caliper jaw 6 opposed to the jaw 2. A thumb screw 7 through the medium of a friction shoe 8 that rides on the outer edge thereof temporarily fixes the carriage to the stem for a coarse adjustment of the movable jaw. For a finer adjustment, a sliding clamping yoke 9 can be fixed to the stem by means of a similar thumb screw 10 and shoe 11. A thumb nut 12 confined by the yoke engages a lead screw 13 that projects from the carriage 5. It is obvious that with the arrangement so far described, when both screws 7 and 10 are loosened, the carriage may be moved to its approximate position. Screw 10 is then tightened and a fine adjustment made with the nut 12. This being reached, screw 7 is also tightened and the desired final adjustment becomes fixed.

The present instrument is designed to measure and register accurately down to a thousandth of an inch. Devices of the kind hitherto used and with which I am familiar have had the objection of possessing registering devices so fine that a magnifying glass was required to make a reading. With the arrangements of this invention, a reading of a thousandth of an inch or less can be easily observed with the unaided eye, while hundredths are registered at another point with the greatest plainness.

To these ends, the inner edge of the stem 3 is provided with a groove in which is seated a rack bar 14. Its ends are undercut and interlocked with the stem, as indicated at 15 in Fig. 8 while it rests against coil springs 16 lying in cavities behind it. This is to insure its accurate and constant meshing with a pinion 17 fixed to a hub connecting two dials 18 and 19 that straddle the rack bar and a portion of the stem. Dial 18 occupies a cavity in the carriage block 5, while dial 19 occupies a similar cavity in a cover plate 20. The hubs, the dial and the pinion turn on a stud 21 on the carriage and as the latter is drawn along the stem it is obvious that the dial will be rotated proportionately. Their calibrations are read through openings 22 on opposite sides of the carriage as they register with indices 23 adjacent thereto.

These openings 22 consist of segmental slots in fixed dials 24 on opposite sides of the carriage. A floating shaft (Fig. 4) 25 extends between them and through the centers thereof with a slight clearance, on the ends of which are two indicator hands 26 that traverse the fixed dials 24. The shaft 25 is carried by the swinging arm 27 mounted on a shouldered stud 28 that also has a leaf spring 29 fixed thereto with its free end bearing on the shaft. Also fixed to the shaft is a pinion 30 and the function is to hold this pinion in proper mesh with teeth on the periphery of dial 18 which also constitutes a relatively large gear. One rotation of this gear and dial on a ratio of one to ten imparts ten rotations to the hands 26 on shaft 25. Thus, if dials 18 and 19 are calibrated in tenths of an inch, the indicators 26 in cooperation with dials 24 will give readings of a hundredths of an inch, or, if the first are calibrated in hundredths, the second will read in thousandths, and so on.

It is believed that the operation is clear from the above description of the structure. The spring mountings of the rack bar and the pinion 30 insure perfect contact without back lash along the true pitch lines.

The fixed caliper arm 2 is of the conformation shown in Fig. 6 and detachably occupies a slot in the base 1 in which it is held by the engagement in a depression 31 in the top thereof of the offset head of a pin 32. The lower end of the pin is threaded and takes into a female screw 33 accessible from the bottom of the base whereby it is drawn down, as shown in dotted lines in Fig. 2, and set with a set screw 34.

I claim as my invention:

1. In a precision instrument of the character described, the combination with a stem, a fixed gauge element thereon and a movable gauge element carried thereby, of a rack bar on the stem, a low denomination dial on the movable element geared to the rack bar, a high denomination dial on the movable element calibrated in multiples of the first and provided with an opening through which the latter is readable, and an indicator on the high denomination dial geared to the low denomination dial.

2. In a precision instrument of the character described, the combination with a stem, a fixed gauge element thereon and a movable gauge element carried thereby, of a rack bar on the stem, spring elements resiliently backing said rack bar, a low denomination dial on the movable element geared to the rack bar, a high denomination dial on the movable element calibrated in multiples of the first, a shaft carrying an indicator for the high denomination dial and a pinion, a swinging support for the shaft, and spring means acting on the support to press the pinion into mesh with the low denomination dial.

3. In a precision instrument of the character described, the combination with a stem and a pair of relatively movable gauging elements carried thereby, of a rack bar on the stem, spring elements resiliently backing said rack bar, and a registering dial on one of said gauging elements geared to the rack bar.

MASSINO RICCI.